UNITED STATES PATENT OFFICE.

AMERICAN PRINT WORKS, OF FALL RIVER, MASSACHUSETTS, ASSIGNEES OF JOHN LIGHTFOOT.

IMPROVEMENT IN PRINTING CERTAIN TEXTILE FABRICS AND YARNS.

Specification forming part of Letters Patent No. 83,182, dated October 20, 1868; Reissue No. 3,647, dated September 28, 1869.

*To all whom it may concern:*

Be it known that JOHN LIGHTFOOT, of Lower House, near Burnley, in the county of Lancaster, England has invented certain new and useful Improvements in Printing Certain Textile Fabrics and Yarns; and the following is declared to be a full, clear, and exact description thereof.

The invention consists in applying indigo preparations of a novel character as regards proportions and conditions to textile fabrics simultaneously with the usual madder mordants, and in connection therewith fixing the same by the use of certain chemicals, the whole undergoing the usual operations of dyeing and cleaning, the result being that the indigo colors are produced in juxtaposition with the mordanted colors. The use of indigotine combined or mixed with an oxide or salt of tin for producing blue figures upon cotton or linen fabrics, and subsequently raising these colors in an alkaline bath, is well known to calico-printers under the name of "fast blue," or, when mixed with a salt of lead, under the name of "fast green." When applied in madder or garancine styles, these colors have been usually blocked into spaces left vacant for them after the pieces have been printed, dyed, cleared, and dried. From time to time attempts have been made to print simultaneously with the madder and garancine mordants preparations of indigo, and even those named above as fast blue and fast green, so as to save the expense of blocking in these colors after dyeing; but, either from the blues and greens so produced having been dull and wanting in vivacity, or from the mordants having been attacked by the alkaline bath used to fix the indigo colors, and the dyed colors thus coming from the bath poor and bare, or from special apparatus having been necessary to print the indigo colors, these attempts have never met with success, and the simultaneous printing of blue and green with mordants intended for dyeing was until this invention a problem unsolved.

The difficulties heretofore existing have by this invention been fully overcome partly by modifying the indigo preparation and partly by the use of a material not known to have been hitherto used in fixing indigo blue and green in juxtaposition with ordinary madder mordants, by means of which are produced fine blues and greens printed at the same time as the ordinary mordants for reds, purples, chocolates, and black, they having with them undergone the processes required to dye and clear these colors. A preparation of indigo is made fulfilling these conditions by employing much less tin, whether as oxide or in the state of salt, in the process of dissolving the indigo, than has hitherto been used, and also by dispensing with the addition of a salt of tin to the precipitated indigotine, whether this has been made by the aid of oxide or salt of tin, or, as is sometimes the case, by the aid of metallic tin, it having been discovered that if the tin is in excess of a certain proportion to the indigo oxide of tin is left in the fiber during the process of fixing the indigo colors and the mordants, and thus, acting itself as a mordant, becomes dyed by the dye-stuff, producing with the indigo compound colors, which in the case of blue are more or less purple and dull, and in the case of green are more or less a somber olive.

A paste or pulp of indigotine and tin is prepared by him by any of the following processes: Of dry indigo in a ground or powdered state he takes one and a quarter pounds, or, in the state usually called "indigo-pulp," he takes three and three-quarter pounds; of protochloride of tin in crystals one and a quarter pound, and of caustic soda at 30° on Twaddell's hydrometer, or of caustic potash at 40° on Twaddell's hydrometer, one gallon. These materials are put in a pan and raised to boil in half an hour, and then he adds one gallon of boiling water. It is preferred now to allow the mixture to become perfectly cold, and pour it into three gallons of cold water, in which it is preferable to dissolve eight ounces of sugar or one pound of treacle, though this addition is not essential. He adds to this solution as a precipitant two and a half pints of muriatic acid at 32° of Twaddell's hydrometer, or one pint of sulphuric acid of commerce previously diluted with one pint of water and allowed to stand till clear, or three quarts of acetic acid at 8° of Twaddell's hydrometer. The indigotine can also be precipitated by a mixture of protochloride of tin solution at 120° of Twaddell's hydrometer with any of the acids named, using one-quarter of a pint of tin solution and only half the quantities of the acids given above, this quantity of tin solution being the maximum that should be used when precipitating the indigotine. Of all these precipitants he prefers to use acetic acid alone. Instead of using protochloride of tin crystals in making the indigo solution he can use protoxide of tin made by precipitating a solution of protosalt of tin with an alkali, the precipitate being washed with water and filtered to a thick paste; or he can take anhydrous protoxide of tin made in any convenient way, in all cases taking such a proportion of oxide as shall contain an amount of tin equal to that in one and a quarter pound of crystallized protochloride. Instead of the protochloride, protoxide, or anhydrous protoxide of tin powdered or granulated metallic tin may be used in such quantity that when one and a quarter pound of indigo and one gallon of alkali be boiled therewith, as before specified, there will yet be metallic tin undissolved, there being but little, if any, liability of the retention by the alkali of too great a proportion of such tin while the indigo is being dissolved. It is preferable, however, in practice to use the preparations of tin hereinbefore referred to. In all these cases he precipitates the indigotine as previously described. He filters the indigotine precipitate through a deep conical filter, so as to leave as small a surface exposed to the air as possible. When filtered, the pulp should measure one gallon, or thereabouts.

To make a blue color for printing, he takes four gallons of indigotine precipitate and fourteen pounds of gum-senegal in powder, stirring until dissolved. Other suitable thickening substances may be used. After straining, the color is ready for printing.

To make a green color, he takes four and a quarter gallons of indigotine pulp and eighteen pounds of gum-senegal in powder, stirs till dissolved, and adds eleven pounds of nitrate of lead in powder and eleven pounds of white acetate of lead in powder, stirs till dissolved, and strains.

Compound colors may be made by mixing the blue and green colors with each other or with the ordinary mordants for dyeing.

With the blue and green above described and the ordinary ferruginous and aluminous mordants he prints cotton and linen fabrics, and after cooling hangs the pieces in a room known to printers as an "aging-room" for one night. He then passes them into a solution of silicate of soda or silicate of potash at 8° of Twaddell's hydrometer, or into a solution of carbonate of potash at 12° of Twaddell's hydrometer, to which about one ounce of chalk in powder per gallon may be added, or into a mixture of silicate of soda or silicate of potash at 8° of Twaddell's hydrometer with carbonate of potash or equivalent alkali at 12° of Twaddell's hydrometer. He heats the bath to 90° Fahrenheit or thereabout, in a cistern fitted with rollers at the top and bottom, and the passage of the pieces may be at the rate of twenty-five yards per minute. On leaving this the pieces must be quickly winced in a pit of cold water fitted with a reel about four feet above the surface of the water. By this wincing the indigotine attached to the fiber becomes again indigo-blue. If the green has been printed, he next passes the pieces into a solution of bichromate of potash containing one ounce of the salt per gallon of water at 100° Fahrenheit for five minutes. The goods are then washed. If only blue has been printed along with the mordants, this process may be omitted. He next subjects the pieces to the operation well known to calico-printers as "second-dunging." They are then washed with water and dyed with madder, munjeet, flower of madder, garancine, extract of madder, mixtures of garancine with sumac and bark, or with either of them, or with cochineal, after which the ordinary process of clearing the white grounds may be given, preference being given to the chloride-of-lime clearing usually given to garancine colors.

Now, although the proportions above given have been found by experiment to be the best for the purpose, they may be slightly varied without departing from the spirit of this invention, which is to keep the ratio of tin to indigo much lower when making indigotine colors intended for printing along with mordants to be dyed with the dye stuffs named, or similar ones, than in the fast blues and greens hitherto in use, and to avoid the use of salt of tin in the printing colors made therefrom; and here let it be observed that no claim is made to making a solution of indigotine in caustic alkali by means of protochloride of tin or protoxide of tin, except with substantially the proportions given above; nor is any claim made to dissolving indigo in caustic alkali by the aid of metallic tin, such solution being well known; nor does he broadly claim the use of carbonate of potash or alkaline silicates for fixing either indigotine colors or mordants when separately applied and considered, as the former has been probably used in the fixing of fast blues and greens made with indigo and tin, and the latter in fixing mordants intended for dyeing, and as a "cow-dung substitute;" but He does claim as new and of his own invention, viz.—

The improvement in the process of printing textile fabrics which consists in modifying the indigo preparation, as herein set forth, and in connection with such modified preparation the use of carbonate of potash, alkaline silicates, or the chemical equivalents of them in simultaneously fixing indigo blue or green, or both, in juxtaposition with ordinary madder mordants, substantially as described.

AMERICAN PRINT WORKS,
By RICHARD BORDEN,
*President.*

Witnesses:
R. C. BROWN,
C. E. LINDSEY.